(12) United States Patent
Bendewald et al.

(10) Patent No.: US 10,146,357 B2
(45) Date of Patent: Dec. 4, 2018

(54) METHOD FOR A DRIVER ASSISTANCE SYSTEM OF A VEHICLE

(71) Applicant: VOLKSWAGEN AG, Wolfsburg (DE)

(72) Inventors: Lennart Bendewald, Wolfsburg (DE); Linn Hackenberg, Wolfsburg (DE)

(73) Assignee: COLKSWAGEN AG (DE)

( * ) Notice: Subject to any disclaimer, the term of this patent is extended or adjusted under 35 U.S.C. 154(b) by 194 days.

(21) Appl. No.: 15/026,653

(22) PCT Filed: Sep. 30, 2014

(86) PCT No.: PCT/EP2014/070979
§ 371 (c)(1),
(2) Date: Apr. 1, 2016

(87) PCT Pub. No.: WO2015/049253
PCT Pub. Date: Apr. 9, 2015

(65) Prior Publication Data
US 2016/0231855 A1    Aug. 11, 2016

(30) Foreign Application Priority Data
Oct. 1, 2013 (DE) .......................... 10 2013 110 864

(51) Int. Cl.
*G06F 3/041* (2006.01)
*B60W 50/14* (2012.01)
(Continued)

(52) U.S. Cl.
CPC .............. *G06F 3/0416* (2013.01); *B60R 1/00* (2013.01); *B60W 30/12* (2013.01); *B60W 30/16* (2013.01);
(Continued)

(58) Field of Classification Search
CPC ..... G06F 3/0416; B60R 1/00; B60R 2300/80; B60W 30/12; B60W 30/16; B60W 50/14;
(Continued)

(56) References Cited

U.S. PATENT DOCUMENTS 4,777,602 A * 10/1988 Wesner ................ G05D 1/0206
                                                    114/144 RE
5,906,645 A *  5/1999 Kagawa .................... B60T 7/12
                                                    180/167
(Continued)

FOREIGN PATENT DOCUMENTS

DE      19743024 A1    4/1999
DE      10056305 C1    1/2002
(Continued)

OTHER PUBLICATIONS

Search Report for International Patent Application No. PCT/EP2014/070979; dated Mar. 19, 2015.

*Primary Examiner* — Anne M Antonucci
*Assistant Examiner* — James E Stroud
(74) *Attorney, Agent, or Firm* — Barnes & Thornburg LLP (57) ABSTRACT

A method for a driver assistance system of a vehicle. The driver assistance system can control the vehicle at least partially automatic by an autopilot function. In the method, an activation state of the autopilot function is determined and a display device of the driver assistance system is activated depending on the activation state of the autopilot function.

19 Claims, 2 Drawing Sheets

(51) Int. Cl.
  *B60W 30/12* (2006.01)
  *B60W 30/16* (2012.01)
  *B62D 1/28* (2006.01)
  *B60R 1/00* (2006.01)
  *G05D 1/00* (2006.01)
  *G01C 21/34* (2006.01)
  *G01C 21/36* (2006.01)

(52) U.S. Cl.
  CPC ............... *B60W 50/14* (2013.01); *B62D 1/28* (2013.01); *G05D 1/0088* (2013.01); *B60R 2300/80* (2013.01); *B60W 2050/146* (2013.01); *G01C 21/3453* (2013.01); *G01C 21/3688* (2013.01)

(58) Field of Classification Search
  CPC . B60W 2050/146; B62D 1/28; G05D 1/0088; G01C 21/3453; G01C 21/3688
  USPC .......................................................... 701/25
  See application file for complete search history.

(56) References Cited

U.S. PATENT DOCUMENTS

| | | | | |
|---|---|---|---|---|
| 5,978,715 | A * | 11/1999 | Briffe | G05D 1/0808 244/1 R |
| 7,693,624 | B2 * | 4/2010 | Duggan | G05D 1/0061 244/75.1 |
| 8,606,455 | B2 * | 12/2013 | Boehringer | B60W 30/17 701/23 |
| 9,174,642 | B2 * | 11/2015 | Wimmer | B60K 35/00 |
| 2004/0090195 | A1 * | 5/2004 | Motsenbocker | B63B 43/18 318/109 |
| 2005/0194192 | A1 * | 9/2005 | Kriger | G01G 19/4142 177/25.19 |
| 2006/0287826 | A1 * | 12/2006 | Shimizu | B60K 35/00 701/431 |
| 2007/0198145 | A1 * | 8/2007 | Norris | B60T 7/22 701/23 |
| 2008/0169965 | A1 * | 7/2008 | Minichshofer | G01S 13/931 342/70 |
| 2009/0312917 | A1 * | 12/2009 | Zawade | B60K 37/06 701/48 |
| 2010/0001700 | A1 * | 1/2010 | Santos | G05F 1/14 323/256 |
| 2012/0080517 | A1 * | 4/2012 | Braunstein | G07F 9/026 235/379 |
| 2013/0035836 | A1 * | 2/2013 | Mehr | B60T 8/172 701/71 |
| 2016/0054849 | A1 * | 2/2016 | Steiger | G06F 3/0414 345/173 |
| 2016/0231743 | A1 * | 8/2016 | Bendewald | B60W 50/0097 |

FOREIGN PATENT DOCUMENTS

| | | |
|---|---|---|
| DE | 10345559 A1 | 4/2004 |
| DE | 102005044607 A1 | 4/2006 |
| DE | 102005052030 A1 | 5/2007 |
| DE | 102006025383 B3 | 12/2007 |
| DE | 102007039375 A1 | 3/2009 |
| DE | 102011082375 A1 | 3/2013 |
| DE | 102012201513 A1 | 8/2013 |

* cited by examiner

METHOD FOR A DRIVER ASSISTANCE SYSTEM OF A VEHICLE

PRIORITY CLAIM

This patent application is a U.S. National Phase of International Patent Application No. PCT/EP2014/070979, filed 30 Sep. 2014, which claims priority to German Patent Application No. 10 2013 110 864.4, filed 1 Oct. 2013, the disclosures of which are incorporated herein by reference in their entirety.

FIELD

Illustrative embodiments relate to a method for a driver assistance system of a vehicle, in particular for a driver assistance system which is capable of at least partially controlling the vehicle with a so-called autopilot function. Disclosed embodiments relate, in particular to an information output concerning the autopilot function. Disclosed embodiments also relate to a driver assistance system which is designed for carrying out this method.

SUMMARY

Modern vehicles, in particular vehicles for road traffic, such as, for example, passenger cars or trucks, are increasingly being fitted with driver assistance systems, which make partial or even fully automatic driving of the vehicle possible. These systems can under certain circumstances independently take over both the lateral guidance and the longitudinal guidance of the vehicle. In this case, a driver of the vehicle does not have to monitor this automatic guidance of the vehicle the whole time, but can at a suitable point in time relinquish the guidance of the vehicle to a so-called autopilot function or retrieve it. When the guidance of the vehicle is taken over by the autopilot function, the driver can at least partially concentrate on other activities.

At present, fully automatic vehicle guidance with an autopilot function is a new experience, and unaccustomed functionality, for most vehicle users. At the same time, dangerous confusion may arise, in particular if at the time in question the driver is not clear whether the responsibility for driving lies with him or with the autopilot function. A clear display of the autopilot function that presents an overview and is intuitive is therefore desirable.

Disclosed embodiments provide a method for a driver assistance system of a vehicle and a driver assistance system for a vehicle.

BRIEF DESCRIPTION OF THE FIGURES

Disclosed embodiments are described in detail below with reference to the accompanying drawings.

DETAILED DESCRIPTION OF THE DISCLOSED EMBODIMENTS

Disclosed embodiments provide a method for a driver assistance system of a vehicle. The driver assistance system has an autopilot function, with which the driver assistance system is capable of controlling the vehicle at least partially automatically, for example, along predetermined sections of a planned route to a destination.

The autopilot function concerns a function of the driver assistance system which is capable of automatically controlling the vehicle at least in some situations or on certain roads, such as, for example, freeways or country roads. In other words, the autopilot function takes over the longitudinal guidance and/or the lateral guidance of the vehicle and controls the vehicle without intervention or action on the part of the driver. The control of the vehicle with the aid of the autopilot function is also referred to as highly automated driving or autonomous driving.

In the case of the method, an activation state of the autopilot function is determined. The activation state of the autopilot function indicates whether or not at the time in question the vehicle is being automatically controlled by means of the autopilot function. In the case of the method, furthermore, a display device of the driver assistance system is activated in dependence on the activation state of the autopilot function. Activating the display device in dependence on the activation state of the autopilot function allows the activation state of the autopilot function to be indicated unambiguously, intuitively and clearly. In particular, the display device may comprise a display device that is used exclusively by the autopilot function or is separate and is arranged in a housing of its own, so that it is immediately clear to a driver or occupant of the vehicle on the basis of the activation state of the display device whether or not the vehicle is being controlled by the autopilot function.

According to a disclosed embodiment, when determining the activation state of the autopilot function, it is determined whether the autopilot function is activated or deactivated. When the autopilot function is activated, the vehicle is controlled automatically by the driver assistance system. The display device of the driver assistance system is activated if the autopilot function is activated. Conversely, the display device is deactivated if the autopilot function is deactivated. Activating the display device of the autopilot function causes the status of the autopilot function to be clearly indicated in a simple way. With the display device deactivated, the quantity of information in the vehicle is reduced, so that the driver, who then has responsibility for driving, is not unnecessarily distracted. Altogether, the probability of a mixup about the driving operating mode, i.e., for example, a mistaken assumption that the autopilot function is active, can be effectively prevented by the display device only being activated when the autopilot function is activated and, conversely, the display device is deactivated when the autopilot function is deactivated. In addition, a clear separation between autopilot functions and other items of information, for example, information of an infotainment system of the vehicle, can be achieved.

According to a disclosed embodiment, the display device is activated by the display device being mechanically adjusted from a first position into a second position. This mechanical adjustment takes place automatically in dependence on the activation state of the autopilot function. In the second position, the display device is arranged in the vehicle in such a way that it can be read from at least one seat position in the vehicle. In the first position, the display device may, for example, be folded away or arranged lowered in a corresponding receptacle in a dashboard of the vehicle. Consequently, when the autopilot function is activated, items of information of the autopilot function can be read off well from the display device and, when the autopilot function is deactivated, the display device can be correspondingly removed from the field of view of the driver so as not to hinder the view of other instruments or, for example, the view through the front windshield of the vehicle. Alternatively or in addition, activating the display device may take place by the display device being switched on. Conversely, the display device may be switched off when the autopilot function is deactivated. Switching off the display device gives an intuitive and clear indication that the autopilot function is likewise switched off. In addition, when the autopilot function is switched off, no distraction is caused by information on the display device. Alternatively or in addition, activating the display device may comprise switching on lighting of the display device. The lighting may, for example, comprise backlighting or lighting from the front. Switching off the lighting may substantially have the effect of stopping an output of information on the display device, so that in turn the activation state of the autopilot function can be clearly and easily sensed by way of the display device. Alternatively or in addition, a view-hindering means may be arranged on the display area of the display device, it automatically being removed when the display device is activated. Such a view-hindering means may be realized, for example, by a so-called "switchable glass", which can be switched to either transparent or opaque by means of suitable activation. Further possibilities for realizing view-hindering means are, for example, coatings of the display area which are activation-dependently transparent to a greater or lesser extent. In the case of freely programmable display devices, for example, a matrix LCD display, such a view-hindering means may also, for example, be simulated by software. As long as the view-hindering means is active, items of information on the display device cannot be read off, or at least substantially cannot be read off. On the other hand, when the view-hindering means have been removed, items of information on the display device can be seen well. As a result, the state of the autopilot function can be indicated intuitively and in a simple way. By using the frosted-glass effect, it can, for example, be additionally shown that the autopilot function would in principle be available, but is not currently activated by the driver. Items of information of the autopilot function are therefore made indecipherable by the frosted-glass effect, at least to a certain extent, and can only be seen well when the autopilot function, and consequently the display device, is activated.

According to a disclosed embodiment, items of information of the autopilot function are output on the display device. The information of the autopilot function may, for example, comprise the remaining duration of a trip that is being automatically controlled by means of the autopilot function. Alternatively or in addition, a future driving maneuver which has been determined by the autopilot function for the automatically controlled trip may be output on the display device. Furthermore, alternatively or in addition, an item of ambient information which has been sensed by the autopilot function as information that is relevant to the automatically controlled trip may be output on the display device. With the display device activated, the driver and the occupants of the vehicle are consequently provided with various items of information by the autopilot function that can increase confidence in the autopilot function, and consequently the acceptance of this novel function.

The display device may, for example, have a display area which is arranged centrally in the lateral direction of the vehicle in a dashboard of the vehicle. The arrangement of the display area in the lateral direction of the vehicle allows the display device to be seen well both by the driver and by other occupants of the vehicle. Alternatively or in addition, the display area of the display device may be arranged adjacently underneath or above a display area of a multimedia system, a configuration system or a navigation system of the vehicle. If, for example, the driver is occupied with the multimedia system or the navigation system of the vehicle during a trip that is being automatically controlled by the autopilot function, with an adjacent arrangement of the display of the autopilot system he can easily follow what the autopilot function is doing and, if need be, react quickly to requests of the autopilot function. Alternatively or in addition, the display device for the output of the autopilot information may comprise a separate portion of a display device in an instrument cluster of the vehicle. This variant is conceivable in particular as an introductory scenario, so that, in vehicles with a customary or classic display configuration, initially the two driving operating modes (manual operation or autopilot operation) are distinguished by a very clear graphical contrast in the instrument cluster. As a result of the separate portion of the display area in the instrument cluster for the output of the information of the autopilot function, a misinterpretation can be substantially prevented. In addition, in a display of, for example, a multimedia system, a configuration system, a navigation system or some other system a reserved region may be provided for man-machine communication, on which the items of information of the autopilot function are shown during the trip that is being controlled by the autopilot function.

According to a disclosed embodiment, the driver assistance system comprises a further display device. This further display device may, for example, comprise part of an instrument cluster, in particular a so-called freely programmable instrument cluster, on which any desired graphical and textual information can be reproduced, or a so-called head-up display, which superimposes items of information graphically or textually on a windshield of the vehicle. When the autopilot function is deactivated, items of information of the driver assistance system are output on this further display device. When the autopilot function is deactivated, items of information of the driver assistance system may, for example, comprise a display indicating that the autopilot function is available for a section of the route lying ahead, or indicating further items of driver assistance information, such as, for example, lane occupancy around the vehicle or a distance from a vehicle driving in front.

According to a further disclosed embodiment, the further display device may be mechanically adjustable between a first position and a second position. In the first position, the display device may be readable, for example, for a driver sitting in a driver's seat of the vehicle, whereas in the second position the display device cannot be read by a driver or occupant sitting in a seat in the vehicle. When the autopilot function is activated, the further display device is adjusted from the first position into the second position. Conversely, when the autopilot function is deactivated, the further display device may be adjusted into the first position again. If the further display device comprises, for example, a display in an instrument cluster in front of a driver's seat of the vehicle, it can be indicated by the adjustment of the further display device into the second position, in which it can no longer be read by the driver, that the driver is then relieved of the driving task and the autopilot function has taken over the guidance of the vehicle. In particular in connection with the automatic mechanical adjustment of the display device for displaying the information of the autopilot function, the display of the current operating mode can be indicated particularly clearly. If the autopilot function takes over vehicle guidance, the further display device is, for example, folded away and the display device for showing the autopilot functions moves out or is adjusted into the viewing range of the occupants. Conversely, when the autopilot function is deactivated, the display device for the output of the information of the autopilot function disappears and the further display device is folded out again.

According to a further disclosed embodiment, the display device comprises input means which can be actuated by an occupant of the vehicle. The input means may, for example, comprise operator control buttons on the display device or in particular a touch-sensitive surface, a so-called touchscreen. By means of the input means, a configuration of the autopilot function is sensed and the autopilot function can be set correspondingly. For example, a route selection or an autopilot driving mode selection can be configured. In the case of the route selection, a corresponding autopilot portion of the route is shown on the display device for each selectable route. The autopilot portion of the route indicates, for example, in percent or kilometers, the portion of the route along which the autopilot function is capable of automatically controlling the vehicle. Selecting a route from the route selection thus allows the driver, for example, to select a route on which there is, for example, the longest possible continuous autopilot portion of the route or alternatively a route which, though it offers less in the way of autopilot portions of the route, is altogether shorter to the destination. With the autopilot driving mode selection it is possible, for example, to select an optimization criterion for the autopilot function. For example, the driver can select whether during automatic driving by means of the autopilot function the vehicle is to drive as quickly as possible or as economically as possible, i.e., with lowest possible consumption.

Furthermore, a driver assistance system for a vehicle is provided. The driver assistance system is capable of controlling the vehicle at least partially automatically by means of an autopilot function. The driver assistance system comprises a display device and a processing device. The processing device is capable of determining an activation state of the autopilot function and of activating the display device based on the activation state of the autopilot function. The driver assistance system is consequently suitable for carrying out the method described above and, therefore, also comprises the benefits described above.

In particular, the driver assistance system may comprise a display device with a mechanical drive. With the aid of the mechanical drive, the display device can be adjusted from a first position into a second position. In the second position, the display device is arranged in the vehicle in such a way that it can be read from at least one seat position in the vehicle. The at least one seat position comprises, for example, at least the driver's seat, but may also comprise other seats, for example, the passenger's seat or a seat on a rear benchseat. If the autopilot function is activated, the display device is activated by the processing device activating the mechanical drive in such a way that it adjusts the display device into the second position. Alternatively or in addition, the display device may be activated by the display device being switched on by the processing device. Furthermore, alternatively or in addition, the display device may be activated by the processing device switching on lighting of the display device. Finally, alternatively or in addition, the display device may have a view-hindering means, which is arranged on a display area of the display device. By means of a controller, which is activated by the processing device, the view-hindering means can be removed. For activating the display device, the control device activates the view-hindering means in such a way that the view-hindering means is removed, i.e., the view of the display area of the display device is cleared.

According to a disclosed embodiment, the driver assistance system is designed in such a way that it has a further display device. The further display device may, for example, comprise an instrument cluster or a head-up display in front of a driver's seat of the vehicle. The control device is capable of outputting items of information of the driver assistance system on the further display device when the autopilot function is deactivated. Consequently, when the autopilot function is activated, items of information of the driver assistance system are shown on a separate display device and, when the autopilot function is deactivated, items of information of the driver assistance system are shown, for example, in the instrument cluster. As a result, it can be easily and clearly recognized by the driver and the occupants of the vehicle whether the driver or the autopilot function is currently in control of the vehicle.

A vehicle which comprises the driver assistance system described above, and therefore also has the benefits described above, is provided. The vehicle is in particular capable of being controlled at least partially automatically.

Figure 1:
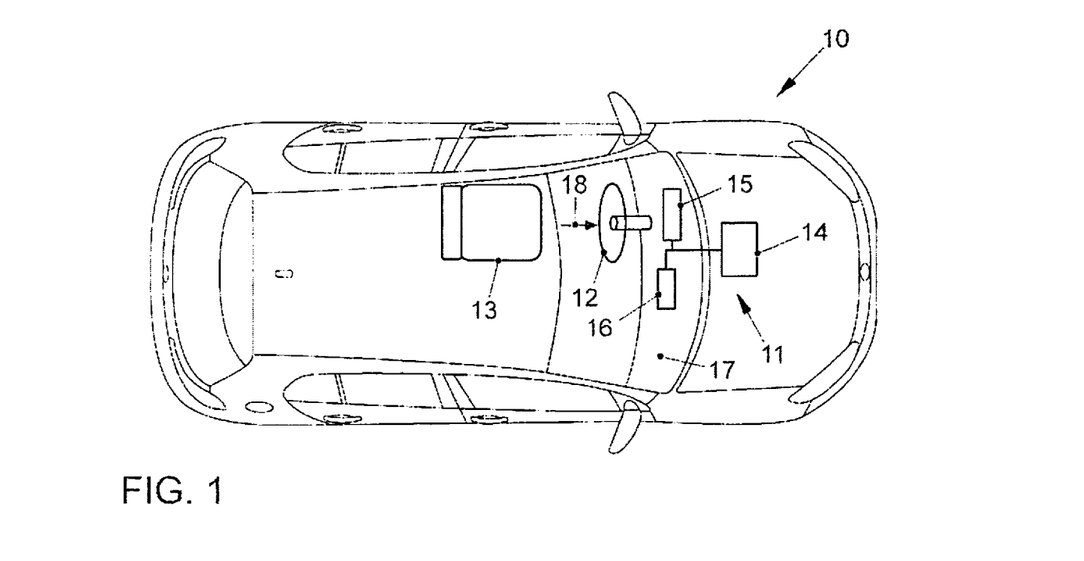
FIG. 1 schematically shows a vehicle according to a disclosed embodiment.

FIG. 1 shows a vehicle 10 with a driver assistance system 11. The vehicle 10 also comprises a steering wheel 12 and a driver's seat 13. The driver assistance system 11 comprises a control device 14, a first display device 15, which is referred to in the claims as the "further display device", and a second display device 16, which is referred to in the claims as the "display device". The processing device 14 is coupled to the first and second display devices 15, 16. The first display device 15 is, for example, arranged in an instrument cluster of the vehicle 10, which is arranged behind the steering wheel 12, out of the view of a driver sitting in the driver's seat 13. The second display device 16 is, for example, arranged approximately centrally in the lateral direction of the vehicle in a dashboard 17 of the vehicle 10.

The driver assistance system 11 is capable of at least partially automatically controlling the vehicle 10. For this purpose, the driver assistance system 14 may automatically control both a lateral guidance and a longitudinal guidance of the vehicle 10 along at least some sections of a route being driven. Consequently, the driver assistance system 11 is capable of controlling the vehicle 10 without any activity on the part of the driver, at least in certain situations. Such functionality of the driver assistance system 11 for automatically controlling the vehicle 10 is referred to hereinafter as the autopilot function. The driver assistance system can, for example, continuously determine whether automatic driving by means of the autopilot function is possible and display this to the driver. The driver can then activate the autopilot function, for example, by actuating corresponding operator control elements on the steering wheel 12. Furthermore, the autopilot function can be activated by, for example, the steering wheel 12 being manually pushed away from the driver in the direction of the dashboard 17. This movement of the steering wheel 12 is illustrated in FIG. 1 by the arrow 18.

If, when the autopilot function is activated, the driver wishes to deactivate the autopilot function, he can bring this about, for example, by actuating corresponding operator control elements on the steering wheel 12 or by manually pulling the steering wheel 12 back toward him from the dashboard 17, that is to say counter to the direction of the arrow 18.

Figure 2:
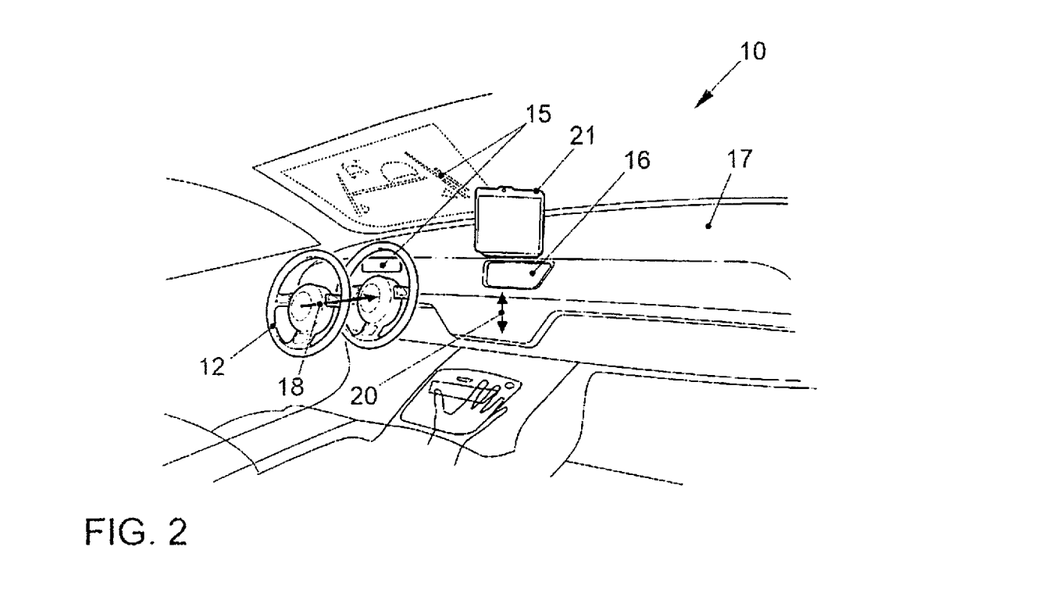
FIG. 2 schematically shows a view of the passenger compartment of the vehicle of FIG. 1.

FIG. 2 schematically shows a perspective view of a passenger compartment of the vehicle 10. As described above, the autopilot function may be activated by moving the steering wheel 12 in the direction of the arrow 18 and be deactivated by moving it counter to the direction of the arrow 18. Furthermore, the first display device 15 and the second display device 16 are shown in FIG. 2. The first display device 15 may, for example, as described above, be a display in a so-called freely programmable display cluster. In addition, the first display device 15 may also comprise a display that is superposed on a windshield of the vehicle, a so-called head-up display. Also shown is a display 21 of a multimedia or navigation system.

The way in which the driver assistance system 11 operates is described in detail below in conjunction with FIG. 3.

Figure 3:
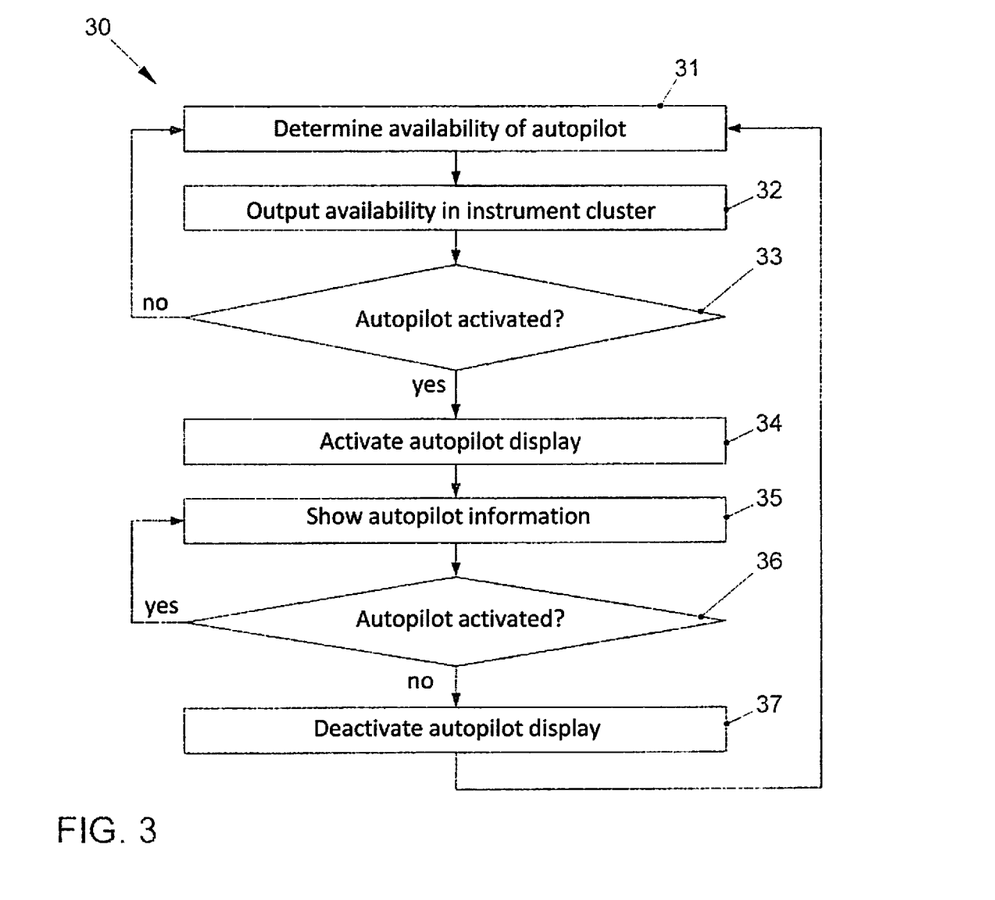
FIG. 3 shows method operations of a method according to a disclosed embodiment.

FIG. 3 shows method operations 31-37 of a method 30 that are performed by the processing device 14. The method 30 is based on a manual driving mode, i.e., the vehicle 10 is controlled manually by a driver who is located in the vehicle 10. A navigation system of the vehicle 10 has, for example, determined a route to a destination or determined an anticipated driving route for the vehicle 10 in any other way desired. Usual items of information for the driver, for example, a speed of the vehicle, a tank filling level, a current engine speed etc., are shown on the first display device 15 in the instrument cluster or the head-up display. During this manual driving, it is determined in operation 31 whether the autopilot function of the driver assistance system 11 is available, i.e., whether the driver assistance system 11 is currently capable of taking over vehicle guidance. The availability of the autopilot function is shown in the instrument cluster or on the head-up display in operation 32. If the autopilot function is available, the driver can, as described above, activate the autopilot function, for example, by actuating corresponding operator control elements on the steering wheel 12 or by displacing the steering wheel 12. This is checked in operation 33. If it is established in operation 33 that the driver has activated the autopilot function, in operation 34 the second display device 16, which is referred to hereinafter as the autopilot display 16, is activated. Activating the autopilot display 16 may take place, for example, by the autopilot display 16 being moved out from a corresponding recess in the dashboard 17 into the viewing range of the driver, as is represented, for example, by the arrow 20 in FIG. 2. The autopilot display 16 may also be brought into the viewing range of the driver or other occupants of the vehicle, for example, by a turning movement. Further alternatives are that in operation 34 the display device 16 is switched on or lit up, for example, by backlighting or other lighting on the autopilot display 16 being activated. The activating of the autopilot display 16 at the same time allows, for example, the head-up display to be at least partially switched off or the instrument cluster to be at least partially switched off or even mechanically folded away or turned away. Such folding away may alternatively also be realized by software. Furthermore, the autopilot display 16 may have on a display surface a so-called "switchable glass", which by being correspondingly activated is optionally substantially transparent or has a frosted-glass effect. In operation 34, a switchover then takes place to activate the autopilot display 16 from the frosted-glass effect to the transparent display. These effects may alternatively also be realized by software. After the activating of the autopilot display 16, in operation 35 items of information of the autopilot function are shown on the autopilot display 16. These items of information may, for example, comprise the remaining duration in the piloted mode or future driving maneuvers. In operation 36, it is checked whether the autopilot function has been deactivated by the driver. If the autopilot function is still active, in operation 35 further items of autopilot information are shown. When the autopilot function is deactivated, in operation 37 the autopilot display 16 is deactivated. For this purpose, the autopilot display 16 may, for example, be folded away or lowered again in the dashboard 17. Alternatively or in addition, for deactivation, the autopilot display 16 may be switched off, lighting of the autopilot display 16 may be switched off or the "switchable glass" described above may be set to the frosted-glass operating mode again. Finally, the display device 15 is activated again.

Use of the separate autopilot display 16 allows a clear separation to be achieved between manual driving and driving by autopilot. The folding away or lowering of the autopilot display 16 allows the wealth of information that is provided in the vehicle in the case of manual driving to be reduced. Use of the change of display described above, between the displays 15 and 16, clearly indicates the current status of the vehicle. Use of the additional autopilot display 16 allows all of the items of information that are relevant to the autopilot to be shown in one place. The central position of the autopilot display 16 makes it possible for it to be seen by the driver and other occupants of the vehicle. While the vehicle is being controlled by the autopilot function, the driver can, for example, concentrate on other tasks. For this purpose, he can, for example, use the display 21 of a so-called head unit in a central console of the vehicle, for example, to watch a movie. In this case, the autopilot display 16 can nevertheless always be peripherally seen well, so that the driver is always well informed in the event of a request for him to resume vehicle guidance. Finally, use of the separate autopilot display 16 allows the probability of a mixup or confusion with respect to the current operating mode of the vehicle to be reduced.

The autopilot display 16 may comprise a so-called touch-screen or an alternative input modality, which can be used for the configuration of the autopilot functionality. For example, a route selection (portion of piloted parts of a route) or a driving mode (ecological or fast) of the autopilot function can be selected. As an alternative to a separate autopilot display 16, as it is shown in FIGS. 1 and 2, the autopilot display may also be an extension of the display device 21 for the head unit or some other man-machine interface in the central console of the vehicle 10, so that the autopilot display 16 does not comprise a separate display device but emerges from the display device of the head unit or assumes a reserved part on it.

Modern vehicles, in particular vehicles for road traffic, such as, for example, passenger cars or trucks, are increasingly being fitted with driver assistance systems, which make partial or even fully automatic driving of the vehicle possible. These systems can under certain circumstances independently take over both the lateral guidance and the longitudinal guidance of the vehicle. In this case, a driver of the vehicle does not have to monitor this automatic guidance of the vehicle the whole time, but can at a suitable point in time relinquish the guidance of the vehicle to a so-called autopilot function or retrieve it. When the guidance of the vehicle is taken over by the autopilot function, the driver can at least partially concentrate on other activities.

DE 197 43 024 A1 relates in this connection to a motor vehicle with means for temporary autonomous vehicle guidance and means for the communication of a vehicle user with at least one electronic communication system. An operator control device is provided, by which the communication means can be activated for the purpose of carrying out a communication process and the vehicle guiding means can be activated for the purpose of autonomous vehicle guidance. When it is detected that manual vehicle guidance will be required, the activated vehicle guiding means transmit an item of takeover information to the communication means, which show this takeover information on a display device.

DE 10 2007 039 375 B4 relates to a motor vehicle with a driver assistance system with a Stop&Go function. The driver assistance system provides longitudinal guidance of the vehicle and comprises a sensing device for sensing items of information concerning a vehicle driving in front. Dependent on the information sensed by means of the sensing device, the driver assistance system can brake the vehicle automatically to a standstill and, when it is sensed that the vehicle driving in front is starting to move again, automatically start it moving again in dependence on an actuation signal that can be given by a driver by way of an input device.

LIST OF DESIGNATIONS

10 Vehicle
11 Driver assistance system
12 Steering wheel
13 Driver's seat
14 Control device
15 First display device
16 Second display device
17 Dashboard
18 Arrow
20 Arrow
21 Display device
30 Method
31-37 Operation

The invention claimed is:

1. A method for a driver assistance system of a vehicle, wherein the driver assistance system controls the vehicle at least partially automatically by an autopilot function, the method comprising:
   activating the autopilot function in response to actuation of an activation mechanism remote from a display device of the driver assistance system;
   determining an activation state of the autopilot function; and
   activating the display device of the driver assistance system based on the activation state of the autopilot function.

2. The method of claim 1, wherein of the activation state of the autopilot function comprises determining whether the autopilot function of the driver assistance system s activated or is deactivated, when n response to activation of the autopilot function, the vehicle s controlled automatically by the driver assistance system, wherein the display device of the driver assistance system is activated n response to activation of the autopilot function, and wherein the display device is deactivated n response to deactivation of the autopilot function.

3. The method of claim 1, the method further comprising: outputting items of information of the autopilot function on the display device.

4. The method of claim 3, wherein the outputting of items of information of the autopilot function on the display device comprises:
   outputting on the display device a remaining duration of a trip that is being automatically controlled by the autopilot function, and/or
   outputting a future driving maneuver which has been determined by the autopilot function for the automatically controlled trip, and/or
   outputting an item of ambient information which has been sensed by the autopilot function as information that is relevant to the automatically controlled trip.

5. The method of claim 1, wherein the display device comprises:
   a display area which is arranged centrally in the lateral direction of the vehicle in a dashboard of the vehicle, and/or
   a display area which is arranged adjacently underneath a display area of a multimedia, configuration or navigation system of the vehicle, and/or
   a display area which is arranged adjacently above a display area of a multimedia, configuration or navigation system of the vehicle, and/or
   a separate portion of a display area in an instrument cluster of the vehicle.

6. The method of claim 1, wherein the driver assistance system has a further display device, the method further comprising:
   outputting items of information of the driver assistance system on the further display device in response to deactivation of the autopilot function.

7. The method of claim 6, the method further comprising:
   mechanically adjusting the further display device from a first position into a second position in response to activation of the autopilot function, the further display device in the second position is arranged in the vehicle so that the further display device cannot be read from seat positions in the vehicle.

8. The method of claim 1, wherein the display device comprises an input device which can be actuated by an occupant of the vehicle, the method further comprising:
   sensing an item of configuration information by the input device for a configuration of the autopilot function.

9. The method of claim 8, wherein the configuration information comprises:
   a route selection, an autopilot portion of the route being shown on the display device for each selectable route of the route selection, the driver assistance system is capable of automatically controlling the vehicle in the autopilot portion of the route, and/or
   an autopilot driving mode selection, with which an optimization criterion for the autopilot function can be set.

10. A driver assistance system for a vehicle, wherein the driver assistance system is capable of controlling the vehicle at least partially automatically by an autopilot function, wherein the driver assistance system comprises:
    a display device;
    an activation mechanism, remote from the display device, and configured to activate the autopilot function in response to selection of the activation mechanism by a driver of the vehicle; and
    a processing device, wherein the processing device determines an activation state of the autopilot function and activates the display device based on the activation state of the autopilot function.

11. The driver assistance system of claim 10, wherein the driver assistance system has a further display device, wherein the control device outputs items of information of the driver assistance system on the further display device in response to deactivation of the autopilot function.

12. The driver assistance system of claim 11, wherein the outputting of items of information of the autopilot function on the display device comprises:

output on the display device a remaining duration of a trip that is being automatically controlled by the autopilot function, and/or output a future driving maneuver which has been determined by the autopilot function for the automatically controlled trip, and/or output an item of ambient information which has been sensed by the autopilot function as information that is relevant to the automatically controlled trip.

13. The system of claim 10, wherein the display device comprises a display area which is arranged centrally in the lateral direction of the vehicle in a dashboard of the vehicle, and/or a display area which is arranged adjacently underneath a display area of a multimedia, configuration or navigation system of the vehicle, and/or a display area which is arranged adjacently above a display area of a multimedia, configuration or navigation system of the vehicle, and/or a separate portion of a display area in an instrument cluster of the vehicle.

14. The system of claim 10, wherein the driver assistance system has a further display device on which items of information of the driver assistance system are output in response to deactivation of the autopilot function.

15. The system of claim 14, wherein the further display device is mechanically adjustable from a first position into a second position in response to activation of the autopilot function, the further display device in the second position being arranged in the vehicle so that the further display device cannot be read from seat positions in the vehicle.

16. The system of claim 10, wherein the display device comprises an input device which can be actuated by an occupant of the vehicle, wherein the input device senses an item of configuration information for a configuration of the autopilot function.

17. The system of claim 16, wherein the configuration information comprises:
a route selection, an autopilot portion of the route being shown on the display device for each selectable route of the route selection, the driver assistance system is capable of automatically controlling the vehicle in the autopilot portion of the route, and/or an autopilot driving mode selection, with which an optimization criterion for the autopilot function can be set.

18. A method for a driver assistance system of a vehicle, wherein the driver assistance system controls the vehicle at least partially automatically by an autopilot function, the method comprising:
activating the autopilot function in response to actuation of an activation mechanism remote from a display device of the driver assistance system;
determining an activation state of the autopilot function; and
activating the display device of the driver assistance system based on the activation state of the autopilot function including at least one of mechanically adjusting the display device from a first position into a second position, wherein the display device in the second position is arranged in the vehicle so that the display device can be read from at least one seat position in the vehicle, and removing a view-hindering section arranged on a display area of the display device.

19. A driver assistance system for a vehicle, wherein the driver assistance system is capable of controlling the vehicle at least partially automatically by an autopilot function, wherein the driver assistance system comprises:
a display device;
an activation mechanism, remote from the display device, and configured to activate the autopilot function in response to selection of the activation mechanism by a driver of the vehicle; and
a processing device, wherein the processing device determines an activation state of the autopilot function and activates the display device based on the activation state of the autopilot function, wherein
the display device has a view-hindering section arranged on a display area of the display device which is removable by a controller and the processing device is configured to activate the controller to remove the view-hindering section as part of activation of the display device, and/or
wherein the display device is adjustable with a mechanical drive from a first position into a second position, the display device in the second position is arranged in the vehicle so that the display device can be read from at least one seat position in the vehicle, and the processing device activates the mechanical drive so that the mechanical drive adjusts the display device into the second position to activate the display device.

* * * * *

UNITED STATES PATENT AND TRADEMARK OFFICE
CERTIFICATE OF CORRECTION

PATENT NO. : 10,146,357 B2
APPLICATION NO. : 15/026653
DATED : December 4, 2018
INVENTOR(S) : Lennart Bendewald et al.

Page 1 of 1

It is certified that error appears in the above-identified patent and that said Letters Patent is hereby corrected as shown below:

On the Title Page

In the Assignee section:
Replace "COLKSWAGEN AG (DE)" with "VOLKSWAGEN AG (DE)"

Signed and Sealed this
Twenty-ninth Day of January, 2019

Andrei Iancu
*Director of the United States Patent and Trademark Office*